United States Patent

[11] 3,607,943

| [72] | Inventor | John S. Warner |
| | | Columbus, Ohio |
| [21] | Appl. No. | 714,793 |
| [22] | Filed | Mar. 21, 1968 |
| [45] | Patented | Sept. 21, 1971 |
| [73] | Assignee | Wm. Wrigley Jr. Co. |
| | | Chicago, Ill. |

[54] PREPARATION OF PYRUVALDEHYDE
9 Claims, No Drawings

[52] U.S. Cl. .................................................. 260/593
[51] Int. Cl. ............................................. C07c 49/04
[50] Field of Search .......................................... 260/596, 594, 593

[56] References Cited
UNITED STATES PATENTS

| 1,955,890 | 4/1934 | Riley | 260/593 |
| 2,624,764 | 1/1953 | Emerson et al. | 260/593 |
| 2,866,823 | 12/1958 | Guest | 260/593 |
| 2,913,497 | 11/1959 | Grimme et al. | 260/593 |
| 3,143,573 | 8/1964 | Bestmann | 260/593 |

*Primary Examiner*—Bernard Helfin
*Assistant Examiner*—W. B. Lone
*Attorney*—LeBlanc & Shur

ABSTRACT: A process for the preparation of pyruvaldehyde which comprises the gradual addition of an aqueous solution of dihydroxyacetone to a water-immiscible organic liquid maintained at a temperature of about 100° C. to about 200° C. in the presence of an acidic catalyst and collecting the pyruvaldehyde produced. Suitable acidic catalysts include sulfuric acid, para-toluene sulfonic acid, acidic ion exchange resins, phosphoric acid and potassium acid sulfate.

PREPARATION OF PYRUVALDEHYDE

BACKGROUND OF THE INVENTION

1. Field of the Invention

This invention relates to a process for the preparation of pyruvaldehyde by the dehydration of dihydroxyacetone.

2. Description of the Prior Art

Pyruvaldehyde is a known material useful as an intermediate in the production of many chemical compounds and also useful per se because of its antivirus activity. For example, it is known to be valuable as an intermediate in the synthesis of particularly potent insecticides of the allethrin type. In one of the steps in the synthesis of the alcohol portion of the allethrin molecule, pyruvaldehyde may be reacted with the beta-keto ester, ethyl 3-keto-6-heptenoate to form 3-hydroxy-8-nonene-2,5-dione. Similarly, in the synthesis of the alcohol portion of the cyclethrin molecule, pyruvaldehyde is reacted with the beta-keto ester, ethyl-4-(2-cyclopentenyl)-3-ketobutyrate to form 6-(2-cyclopentenyl)-3-hydroxy-2,5-hexanedione. In recent years, this material has become even more valuable in a varied number of chemical synthesis.

The prior art is cognizant of many attempts to prepare puruvaldehyde without the excessive formation of impurities by reason of side reactions. However, none of these prior attempts have been successful as the pyruvaldehyde produced commercially today has large amounts of impurities, primarily formaldehyde, which in some applications must be removed prior to use. Consequently, the additional purification step or steps serves to increase the cost of the material and reduce the efficiency of the reaction.

For many years pyruvaldehyde was prepared commercially by the vapor phase oxidation of propylene glycol, this method being particularly attractive because of the inexpensive starting materials employed in the process. However, the presence of appreciable amounts, up to 5 percent, of formaldehyde in the resultant product has made it unsuitable for use in a number of areas, such as in the above reactions for producing allethrin-type insecticides or in the food industry, without further expensive and time consuming purification procedures.

It is therefore clear that a distinct need remains in the art for a commercially attractive process for the preparation of pyruvaldehyde in good yields and high purity.

SUMMARY OF THE INVENTION

It is accordingly one object of the present invention to provide a process for the production of pyruvaldehyde which overcomes or otherwise mitigates the problems of the prior art.

A further object of the invention is to provide a process for the preparation of pyruvaldehyde by dehydration of dihydroxyacetone in an efficient manner wherein good yields of high purity product are obtained.

A still further object of the invention is to provide an economic and commercially attractive process for the preparation of pyruvaldehyde by dehydration of dihydroxyacetone in the presence of an acidic catalyst wherein pyruvaldehyde of low formaldehyde content is obtained in high yield.

Other objects and advantages of the present invention will become apparent as the description thereof proceeds.

In satisfaction of the foregoing objects and advantages, there is provided by this invention a process for the preparation of pyruvaldehyde which comprises the gradual addition of an aqueous solution of dihydroxyacetone to a water-immiscible organic liquid maintained at a temperature of about 100° C. to 200° C. in the presence of an acidic catalyst and collecting the pyruvaldehyde produced. Collection is by way of condensation of the water and pyruvaldehyde vapors resulting from the process.

DESCRIPTION OF THE PREFERRED EMBODIMENT

In accordance with the novel aspects of the present invention, it has been discovered that aqueous solutions of pyruvaldehyde may be prepared from dihydroxyacetone in yields of 60 to 90 percent. The process in its broadest embodiment is carried out by the gradual addition of an aqueous solution of dihydroxyacetone to a water-immiscible organic liquid maintained at a temperature of about 100° C. to 200° C. at atmospheric or reduced pressure and preferably in an inert atmosphere. The pyruvaldehyde is obtained as an aqueous distillate or as an aqueous phase from a condensed azeotrope, is nearly colorless, contains approximately 5 to 50 percent substantially pure pyruvaldehyde and contains less than about 0.04 percent formaldehyde. It is thus to be appreciated that the process of the invention permits the production of good yields of good quality pyruvaldehyde by a simple and economically feasible process.

The process of the invention is carried out, as pointed out above, by dehydration of dihydroxyacetone in the presence of an acidic hydration catalyst. Dihydroxyacetone is a compound well known to the prior art and may be characterized by the following formula:

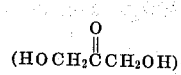

This material is commercially available, being prepared by the fermentation of sugar by certain micro-organisms or by the reaction of 1,3-dihaloacetone with sodium hydroxide. Pyruvaldehyde is monomeric in the vapor state or when condensed at very low temperature. In water it forms hydrate and polymers.

The process of the present invention, whereby dihydroxyacetone is dehydrated to form the pyruvaldehyde, may be characterized by the following equation:

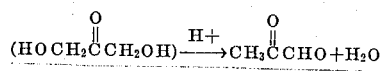

The process of this invention is preferably carried out by the gradual addition of an aqueous solution of the dihydroxyacetone to a water-immiscible organic liquid, being maintained at a temperature of about 100° C. to 200° C. and condensing the vapors of water, pyruvaldehyde, and organic liquid which are evolved. An aqueous solution of the product separates from any immiscible organic liquid present in the azeotrope.

It is believed that under the conditions of the reaction the dihydroxyacetone is dehydrated immediately on contact with the hot liquid and that the immediate vaporization of the pyruvaldehyde and water removes them from the area of dehydration and serves to prevent the pyruvaldehyde from reacting further to form undesirable side products.

The dihydroxyacetone starting material is employed as an aqueous solution and preferably as an aqueous solution of about 10 to 60 percent concentration. It is preferred to employ aqueous solutions of about 30 to 50 percent concentration as it has been found that with concentrations of about 50 percent, while somewhat lower yields are obtained, the concentration of pyruvaldehyde in the aqueous distillate is considerably higher.

To effect the dehydration of the dihydroxyacetone, an acidic catalyst is employed in the reaction. The catalyst is preferably maintained as an aqueous solution and is preferably added to the solution of dihydroxyacetone prior to addition to the hot organic liquid. Acidic catalysts which have been found to be satisfactory in the present process include sulfuric acid, para-toluene sulfonic acid, phosphoric acid, potassium acid sulfate, acidic ion exchange resins and the like. Particularly preferred catalysts are sulfuric acid, para-toluene sulfonic acid and potassium acid sulfate as excellent results are achieved using these catalytic materials. However it is to be understood that equivalent acidic catalysts may be employed in the process.

The acidic catalysts, as pointed out above, are preferably employed in the process of this invention by the use of a dilute solution thereof in association with the aqueous solution of dihydroxyacetone. For example, dilute sulfuric acid such as 0.1 to 1.0 N, and 1 to 10 percent solutions of para-toluene sulfonic acid may be employed. In forming the starting material solution, it is preferable to make up a solution comprising an aqueous solution of the dihydroxyacetone and acidic catalyst and adding the resulting solution to the hot water-immiscible liquid as described hereinafter. In the case where an acidic exchange resin is used as the catalyst, it is desirable to suspend this catalyst in a water-immiscible organic liquid to which the starting material solution is then added and effect the reaction in this manner.

In conducting the process of this invention, the aqueous solution described above is added gradually to a water-immiscible organic liquid maintained at a temperature of about 100° C. to about 200° C. A preferred temperature at which the water-immiscible organic liquid should be maintained is about 120° C. to 160° C.

In a preferred embodiment of the invention, the dihydroxyacetone solution is added gradually to the surface of a water-immiscible organic liquid maintained at a temperature of about 100° C. to 200° C. at atmospheric or reduced pressure and preferably in an inert atmosphere. The water-immiscible organic liquids which may be employed generally include the hydrocarbons and halohydrocarbons and specifically include mineral oil, orthodichlorobenzene, 1,2,4-trichlorobenzene, bis-(2-chloroethyl) ether, 1,2,3-trichlorobenzene, 1,2,3-trichloropropane, petroleum solvents, such as those boiling within the distillation range of 120° C. to 200° C., tetrachloroethane and the like. The water-immiscible organic liquid may of course be any material equivalent to the above. Preferred materials falling within the above class of organic liquids are mineral oil and the petroleum solvents as most satisfactory yields have been obtained thereby.

The reaction is preferably conducted by utilization of the water-immiscible organic liquid in volumetric amount equal to or in excess of the volume of aqueous dihydroxyacetone solution to be added. The water-immiscible organic liquid is preferably placed in a reaction flask with vigorous stirring and heated to the required temperature of about 100° C. to 200° C. The flask is preferably equipped with a distillate receiver, such as a Barrett-type receiver, to collect the aqueous distillate and permit the immiscible organic layer to return to the reaction flask. In a preferred embodiment for conducting the process, the organic liquid is maintained at about 120° C. to 160° C. under an inert atmosphere, such as an atmosphere of nitrogen, argon, or similar inert gas, and is maintained at atmospheric pressure when petroleum solvents are used or at reduced pressure when mineral oil is used.

When the dihydroxyacetone solution is added to the reaction flask containing the water-immiscible organic liquid, a distillate immediately distills therefrom and is easily recovered. This distillate will be found to contain from about 5 to 50 percent of a nearly colorless pyruvaldehyde solution containing less than 0.04 percent formaldehyde. Yields of pyruvaldehyde based on the dihydroxyacetone starting material will be found to range from 60 to 90 percent.

The distillate obtained by the dehydration reaction may be extracted with low boiling petroleum ether or equivalent material to remove any traces of the higher boiling organic immiscible liquid employed and then sparged with nitrogen to remove traces of any petroleum ether. Yields of pyruvaldehyde may be determined by gas chromatography and by titration procedures standard to the art.

The following examples illustrate the invention but they are not intended to limit it thereto:

EXAMPLE I

A solution of 3,950 grams of dihydroxyacetone in 3,950 ml. of 0.5 N sulfuric acid was added with vigorous stirring over a 14-hour period to 5,000 ml. of petroleum solvent (distillation range: 182°–199° C.) in a reaction flask heated at 140°–150° C. under an atmosphere of nitrogen. A condenser and a Barrett-type receiver was employed to collect the aqueous distillate and permit the less dense organic layer to return to the reaction flask. A dark solid byproduct formed in the flask. The aqueous distillate was extracted with 1000 ml. of low-boiling petroleum ether and sparged with nitrogen for a few minutes. The resulting aqueous solution weighed 7,3357 grams and contained 31.4 percent pyruvaldehyde and 0.02 percent or less formaldehyde. This represented a 73 percent yield.

EXAMPLE II

A solution of 50 grams of dihydroxyacetone in 50 grams of 5 percent aqueous p-toluene sulfonic acid was added dropwise with vigorous stirring to 500 ml. of petroleum solvent (distillation range: 180°–199° C.) while heating at 150° C. in a reaction flask. A condenser and a Barrett-type receiver was used to collect the aqueous distillate and permit the less dense organic layer to return to the reaction flask. A dark solid byproduct formed in the flask. The aqueous distillate weighed 88.3 grams and contained 32.9 percent pyruvaldehyde and 0.03 percent or less formaldehyde. This represented a 73 percent yield.

EXAMPLE III

A suspension of 100 grams of a strongly acidic cation exchange resin (Amberlite IR–120 H.C.P.) in 250 ml. of naphthol spirits (distillation range: 157°–165° C.) was heated with stirring under a nitrogen atmosphere in a reaction flask to 120° C. to distill off most of the water associated with the resin. A condenser and a Barrett-type receiver was used to collect the aqueous distillate and permit the organic layer to return to the reaction flask. To the suspension of resin, a solution of 50 grams of dihydroxyacetone in 50 grams of water was added dropwise while the temperature was maintained at 115°–120° C. This was followed by the dropwise addition of 12 ml. of water. The pale yellow aqueous distillate weighed 106.9 grams and contained 22.7 percent pyruvaldehyde and 0.02 percent or less formaldehyde. This represented a 61 percent yield.

EXAMPLE IV

A solution of 25 grams of dihydroxyacetone in 75 grams of 0.1 N sulfuric acid was added dropwise with vigorous stirring to a reaction flask containing 500 ml. of tetrachloroethane maintained at a temperature of 130° C. A condenser and a modified Barrett-type receiver was used to collect the aqueous distillate and permit the more dense organic layer to return to the reaction flask. A dark solid byproduct formed in the flask. The aqueous distillate weighed 91.0 grams and contained 16.7 percent pyruvaldehyde and 0.02 percent or less formaldehyde. This represented a 76 percent yield.

Modifications of the invention other than are described in the foregoing examples will be apparent to those skilled in the art and such modifications are considered to be included within the scope of the appended claims.

What is claimed and desired to be secured by United States Letters Patent is:

1. The process for the preparation of pyruvaldehyde which comprises the gradual addition of an aqueous solution of dihydroxyacetone to a water-immiscible hydrocarbon or halohydrocarbon maintained at a temperature of about 100° to 200° C. in the presence of an acidic hydration catalyst and collecting the pyruvaldehyde produced.

2. A process according to claim 1 wherein the aqueous solution of dihydroxyacetone contains dihydroxyacetone in a concentration of about 10 to 70 percent.

3. A process according to claim 1 wherein the acidic catalyst is maintained in the dihydroxyacetone aqueous solution.

4. A process according to claim 1 wherein the acidic catalyst is selected from the group consisting of sulfuric acid, para-toluene sulfonic acid, phosphoric acid, potassium acid sulfate, and acidic ion-exchange resins.

5. A process according to claim 1 wherein the water-immiscible hydrocarbon or halohydrocarbon is selected from the group consisting of mineral oil, petroleum solvents having a boiling range of 120° to 200° C., ortho-dichlorobenzene, trichlorobenzene, trichloropropane, bis-(2-chloroethyl) ether, and tetrachloroethane.

6. A process according to claim 1 wherein the dihydroxyacetone solution is added gradually to a water-immiscible hydrocarbon or halohydrocarbon maintained at a temperature of 120° to 160° C.

7. A process according to claim 1 wherein the reaction is carried out at a reduced pressure.

8. The process according to claim 1 wherein the reaction is carried out at an atmospheric pressure.

9. The process according to claim 1 wherein the reaction is carried out under an inert atmosphere.